United States Patent
McCarthy et al.

(10) Patent No.: US 9,771,626 B2
(45) Date of Patent: Sep. 26, 2017

(54) STARTING A SMELTING PROCESS

(71) Applicant: TECHNOLOGICAL RESOURCES PTY. LIMITED, Brisbane, Queensland (AU)

(72) Inventors: Carolyn McCarthy, Palmyra (AU); Rodney James Dry, City Beach (AU)

(73) Assignee: Technological Resources Pty. Limited (AU)

( * ) Notice: Subject to any disclaimer, the term of this patent is extended or adjusted under 35 U.S.C. 154(b) by 211 days.

(21) Appl. No.: 14/416,378

(22) PCT Filed: Jul. 18, 2013

(86) PCT No.: PCT/AU2013/000792
§ 371 (c)(1),
(2) Date: Jan. 22, 2015

(87) PCT Pub. No.: WO2014/015364
PCT Pub. Date: Jan. 30, 2014

(65) Prior Publication Data
US 2015/0259758 A1    Sep. 17, 2015

(30) Foreign Application Priority Data

Jul. 25, 2012 (AU) .................. 2012903173

(51) Int. Cl.
*C21B 11/08* (2006.01)
*C21B 13/10* (2006.01)
(Continued)

(52) U.S. Cl.
CPC .......... *C21B 11/08* (2013.01); *C21B 13/0006* (2013.01); *C21B 13/0013* (2013.01);
(Continued)

(58) Field of Classification Search
CPC ..... C21B 11/08; C21B 13/0006; C21B 13/10; C21B 13/14; C21C 5/04; C21C 5/4646;
(Continued)

(56) References Cited

U.S. PATENT DOCUMENTS 5,302,184 A    4/1994 Batterham et al.
6,517,605 B1*  2/2003 Bates .................. C21B 13/0013
                                                    75/531

(Continued)

FOREIGN PATENT DOCUMENTS

WO    9631627 A1    10/1996
WO    0022176 A1    4/2000
(Continued)

OTHER PUBLICATIONS

Nakagawa, et al. WO 2004050920 published Jun. 2004. Machine translation.*

(Continued)

*Primary Examiner* — George Wyszomierski
*Assistant Examiner* — Tima M McGuthry Banks
(74) *Attorney, Agent, or Firm* — Banner & Witcoff, Ltd.

(57) ABSTRACT

A method of starting a molten bath-based process for smelting a metalliferous material is disclosed. The method includes using the heat flux of water-cooled elements in lower parts of a smelting vessel to provide an indication of molten bath temperature during at least an early part of the start-up method and adjusting injection rates of oxygen-containing gas and/or carbonaceous material into the smelting vessel to control the molten bath temperature during start-up without exceeding critical heat flux levels and tripping the start-up method.

14 Claims, 3 Drawing Sheets

(51) Int. Cl.

| | |
|---|---|
| *C21B 13/14* | (2006.01) |
| *C21C 5/46* | (2006.01) |
| *C21C 5/56* | (2006.01) |
| *F27B 3/04* | (2006.01) |
| *F27B 3/24* | (2006.01) |
| *F27B 3/28* | (2006.01) |
| *C21B 13/00* | (2006.01) |
| *F27B 3/02* | (2006.01) |
| *F27B 3/22* | (2006.01) |
| *C21C 5/04* | (2006.01) |
| *C22B 5/10* | (2006.01) |
| *C21C 5/30* | (2006.01) |
| *C21C 5/52* | (2006.01) |
| *F27D 3/16* | (2006.01) |
| *F27D 3/18* | (2006.01) |

(52) U.S. Cl.
CPC .............. *C21B 13/10* (2013.01); *C21B 13/14* (2013.01); *C21C 5/04* (2013.01); *C21C 5/4646* (2013.01); *C21C 5/567* (2013.01); *C22B 5/10* (2013.01); *F27B 3/02* (2013.01); *F27B 3/045* (2013.01); *F27B 3/22* (2013.01); *F27B 3/24* (2013.01); *F27B 3/28* (2013.01); *C21C 5/305* (2013.01); *C21C 2005/5288* (2013.01); *C21C 2100/02* (2013.01); *C21C 2200/00* (2013.01); *F27D 2003/168* (2013.01); *F27D 2003/185* (2013.01); *Y02P 10/136* (2015.11); *Y02P 10/216* (2015.11); *Y02P 10/265* (2015.11); *Y02P 10/283* (2015.11)

(58) Field of Classification Search
CPC ... C21C 5/567; C22B 5/10; F27B 3/24; F27B 3/28
See application file for complete search history.

(56) References Cited

U.S. PATENT DOCUMENTS

2005/0284262 A1\* 12/2005 Denys ................. C21B 13/0006
75/531
2014/0130636 A1\* 5/2014 Lundh ................... C21C 5/5211
75/10.12

FOREIGN PATENT DOCUMENTS

| WO | WO2004050920 | \* | 6/2004 |
| WO | 2007134382 A1 | | 11/2007 |

OTHER PUBLICATIONS

International Search Report mailed Oct. 4, 2013 (PCT/AU2013/000792); ISA/AU.
International Preliminary Examination Report under Chapter II mailed May 1, 2014 (PCT/AU2013/000792); IPEA/AU.

\* cited by examiner

STARTING A SMELTING PROCESS

CROSS REFERENCE TO RELATED APPLICATIONS

The present application is a U.S. National Phase of International Application No. PCT/AU2013/000792, filed on Jul. 18, 2013, designating the United States of America and claiming priority to Australian Patent Application No. 2012903173, filed Jul. 25, 2012. The present application claims priority to and the benefit of the above-identified applications, each of which is incorporated by reference herein in its entirety.

TECHNICAL FIELD

The present invention relates to a method of starting a process for smelting a metalliferous material.

The term "metalliferous material" is understood herein to include solid feed material and molten feed material. The term also includes within its scope partially reduced metalliferous material.

The present invention relates more particularly, although by no means exclusively, to a method of starting a molten bath-based smelting process for producing molten metal from a metalliferous feed material in a smelting vessel that has a strong bath/slag fountain generated by gas evolution in the molten bath, with the gas evolution being at least partly the result of devolatilisation of carbonaceous material into the molten bath.

In particular, although by no means exclusively, the present invention relates to a method of starting a process for smelting an iron-containing material, such as an iron ore, and producing molten iron.

The present invention relates particularly, although by no means exclusively, to a method of starting a smelting process in a smelting vessel that includes a smelting chamber for smelting metalliferous material.

BACKGROUND ART

A known molten bath-based smelting process is generally referred to as the HIsmelt process, is described in a considerable number of patents and patent applications in the name of the applicant.

Another molten bath-based smelting process is referred to hereinafter as the "HIsarna" process. The HIsarna process and apparatus are described in International application PCT/AU99/00884 (WO 00/022176) in the name of the applicant.

The HIsmelt and the HIsarna processes are associated particularly with producing molten iron from iron ore or another iron-containing material.

In the context of producing molten iron, the HIsmelt process includes the steps of:

(a) forming a bath of molten iron and slag in a smelting chamber of a smelting vessel;

(b) injecting into the bath: (i) iron ore, typically in the form of fines; and (ii) a solid carbonaceous material, typically coal, which acts as a reductant of the iron ore feed material and a source of energy; and (c) smelting iron ore to iron in the bath.

The term "smelting" is herein understood to mean thermal processing wherein chemical reactions that reduce metal oxides take place to produce molten metal.

In the HIsmelt process solid feed materials in the form of metalliferous material and solid carbonaceous material are injected with a carrier gas into the molten bath through a number of lances which are inclined to the vertical so as to extend downwardly and inwardly through the side wall of the smelting vessel and into a lower region of the vessel so as to deliver at least part of the solid feed materials into the metal layer in the bottom of the smelting chamber. The solid feed materials and the carrier gas penetrate the molten bath and cause molten metal and/or slag to be projected into a space above the surface of the bath and form a transition zone. A blast of oxygen-containing gas, typically oxygen-enriched air or pure oxygen, is injected into an upper region of the smelting chamber of the vessel through a downwardly extending lance to cause post-combustion of reaction gases released from the molten bath in the upper region of the vessel. In the transition zone there is a favourable mass of ascending and thereafter descending droplets or splashes or streams of molten metal and/or slag which provide an effective medium to transfer to the bath the thermal energy generated by post-combusting reaction gases above the bath.

Typically, in the case of producing molten iron, when oxygen-enriched air is used, it is fed at a temperature of the order of 1200° C. and is generated in hot blast stoves. If technically pure cold oxygen is used, it is typically fed at or close to ambient temperature.

Off-gases resulting from the post-combustion of reaction gases in the smelting vessel are taken away from the upper region of the smelting vessel through an off-gas duct.

The smelting vessel includes refractory-lined sections in the lower hearth and water cooled panels in the side wall and the roof of the vessel, and water is circulated continuously through the panels in a continuous circuit.

The HIsmelt process enables large quantities of molten iron, typically at least 0.5 Mt/a, to be produced by smelting in a single compact vessel.

The HIsarna process is carried out in a smelting apparatus that includes (a) a smelting vessel that includes a smelting chamber and lances for injecting solid feed materials and oxygen-containing gas into the smelting chamber and is adapted to contain a bath of molten metal and slag and (b) a smelt cyclone for pre-treating a metalliferous feed material that is positioned above and communicates directly with the smelting vessel.

The term "smelt cyclone" is understood herein to mean a vessel that typically defines a vertical cylindrical chamber and is constructed so that feed materials supplied to the chamber move in a path around a vertical central axis of the chamber and can withstand high operating temperatures sufficient to at least partially melt metalliferous feed materials.

In one form of the HIsarna process, carbonaceous feed material (typically coal) and optionally flux (typically calcined limestone) are injected into a molten bath in the smelting chamber of the smelting vessel. The carbonaceous material is provided as a source of a reductant and a source of energy. Metalliferous feed material, such as iron ore, optionally blended with flux, is injected into and heated and partially melted and partially reduced in the smelt cyclone. This molten, partly reduced metalliferous material flows downwardly from the smelt cyclone into the molten bath in the smelting vessel and is smelted to molten metal in the bath. Hot reaction gases (typically CO, $CO_2$, $H_2$, and $H_2O$) produced in the molten bath is partially combusted by oxygen-containing gas (typically technical-grade oxygen) in an upper part of the smelting chamber. Heat generated by the post-combustion is transferred to molten droplets in the upper section that fall back into the molten bath to maintain the temperature of the bath. The hot, partially-combusted reaction gases flow upwardly from the smelting chamber and enter the bottom of the smelt cyclone. Oxygen-containing gas (typically technical-grade oxygen) is injected into the smelt cyclone via tuyeres that are arranged in such a way as to generate a cyclonic swirl pattern in a horizontal plane, i.e. about a vertical central axis of the chamber of the smelt cyclone. This injection of oxygen-containing gas leads to further combustion of smelting vessel gases, resulting in very hot (cyclonic) flames. Incoming metalliferous feed material, typically in the form of fines, is injected pneumatically into these flames via tuyeres in the smelt cyclone, resulting in rapid heating and partial melting accompanied by partial reduction (roughly 10-20% reduction). The reduction is due to both thermal decomposition of hematite and the reducing action of $CO/H_2$ in the reaction gases from the smelting chamber. The hot, partially melted metalliferous feed material is thrown outwards onto the walls of the smelt cyclone by cyclonic swirl action and, as described above, flows downwardly into the smelting vessel below for smelting in the smelting chamber of that vessel.

The net effect of the above-described form of the HIsarna process is a two-step countercurrent process. Metalliferous feed material is heated and partially reduced by outgoing reaction gases from the smelting vessel (with oxygen-containing gas addition) and flows downwardly into the smelting vessel and is smelted to molten iron in smelting chamber of the smelting vessel. In a general sense, this countercurrent arrangement increases productivity and energy efficiency.

The HIsmelt and the HIsarna processes include solids injection into molten baths in smelting vessels via water-cooled solids injection lances.

In addition, a key feature of both processes is that the processes operate in smelting vessels that include a smelting chamber for smelting metalliferous material and a forehearth connected to the smelting chamber via a forehearth connection that allows continuous metal product outflow from the vessels. A forehearth operates as a molten metal-filled siphon seal, naturally "spilling" excess molten metal from the smelting vessel as it is produced. This allows the molten metal level in the smelting chamber of the smelting vessel to be known and controlled to within a small tolerance—this is essential for plant safety. Molten metal level must (at all times) be kept at a safe distance below water-cooled elements such as solids injection lances extending into the smelting chamber, otherwise steam explosions become possible. It is for this reason that the forehearth is considered an inherent part of a smelting vessel for the HIsmelt and the HIsarna processes.

The term "forehearth" is understood herein to mean a chamber of a smelting vessel that is open to the atmosphere and is connected to a smelting chamber of the smelting vessel via a passageway (referred to herein as a "forehearth connection") and, under standard operating conditions, contains molten metal in the chamber, with the forehearth connection being completely filled with molten metal.

Normal start-up for both the HIsmelt and the HIsarna processes in a smelting vessel includes the following steps:

1. Preheating refractories in the lower parts of the (nominally empty) smelting vessel, including the forehearth chamber and the forehearth connection.

2. Pouring externally prepared hot metal into the smelting vessel via the forehearth in such a quantity that the metal level is at least about 100 mm above the top of the forehearth connection.

3. Optionally injecting fuel gas (such as natural gas or LPG) and oxygen-containing gas into the gas space above the metal bath for a period of time to generate heat in the smelting chamber.

4. Commencing and thereafter continuing injection of coal (preferably with flux additions) and oxygen-containing gas, for the purpose of heating the metal charge and initiating slag formation and increasing the amount of slag.

5. Optionally injecting crushed slag and/or slag-forming agents such as silica sand/bauxite plus lime/dolomite flux to further accelerate slag formation.

6. Initiating injection of iron-containing material such as iron ore (together with coal and flux) to commence normal smelting operation.

Practical experience of the applicant has shown that the above start-up sequence, if not carefully controlled, can easily lead to excessively high heat fluxes on water-cooled elements, such as water-cooled panels, in the lower parts of the smelting vessel—typically greater than 500 $kW/m^2$ heat fluxes.

For the purpose of this discussion, the term "lower parts" is understood to mean the exposed water-cooled elements (normally coated with a layer of frozen slag when the plant is in operation) in the bottom 2-2.5 m (vertically) of all water-cooled elements within the smelting vessel when the plant is of "small" industrial size (e.g. HIsmelt 6 m vessel). For a smaller plant (e.g. HIsarna 2.5 m pilot plant) this distance will be proportionally reduced, and may be around 1-1.5 m. Conversely, for a very large plant (e.g. HIsmelt 8 m plant) this distance will increase to about 2.5-3 m.

An "exposed" water-cooled element is understood herein to mean an element which:

(i) has at least 30% of its external surface area that is inside the vessel splashed with molten metal and/or slag when the plant is in normal operation, and (ii) is cooled internally by convective heat transfer to water in the liquid phase, with the cooling water typically being in the range 10-80° C. and 0-10 bar gauge, and water velocity in the cooling channels exceeding 0.5 m/s.

Depending on the particular design of water-cooled elements in the lower parts of the smelting vessel, heat fluxes in excess of 500 $kW/m^2$ can trip the plant, forcing the start-up sequence to be aborted temporarily. Water-cooled elements can be designed to withstand higher heat fluxes (e.g. 700-800 $kW/m^2$), although this tends to increase cost of the elements. With water-cooled elements designed to withstand heat fluxes in excess of 500 $kW/m^2$ the "window" of operation is larger, but the same overall logic applies.

For the purpose of this discussion the amount of "500 $kW/m^2$" is understood to mean the design maximum heat flux of water-cooled elements in the lower parts of the vessel. It is emphasised that the present invention is not confined to water-cooled elements having a design maximum heat flux of 500 $kW/m^2$. The measurement of these heat fluxes is also understood to exclude short-term (<30 second) (measurement-related) fluctuations, with heat fluxes referred to herein being time-averaged over 30 seconds or more.

If the plant trips as a result of heat fluxes in excess of the design maximum heat flux, the result is a delay leading to unplanned cooling of metal in the smelting vessel—in particular, cooling of metal in the forehearth connection. If the metal cools beyond a certain point it becomes necessary to end-tap the vessel to avoid a frozen forehearth connection. The entire start-up is thus aborted and the whole start-up sequence must start again (at significant cost and lost production time).

In general, the period during which water-cooled elements in the lower parts of the smelting vessel are subject to possible high heat flux exposure is limited to the time needed to establish a slag layer deep enough to (predominantly) slag-splash and/or slag-submerge the bottom row of water-cooled elements. Once slag-splashed or slag-submerged, these water-cooled elements form moderately thick (>10 mm) slag freeze-layers and heat fluxes drop to significantly lower levels (typically <200-250 kW/m$^2$).

The above description is not to be taken as an admission of the common general knowledge in Australia or elsewhere.

SUMMARY OF THE DISCLOSURE

The present invention is based on a realisation that (1) heat flux of water-cooled elements in the lower parts of the smelting vessel as described herein provides an indication of molten bath temperature during an early part of the start-up sequence and, (2) using this information it is possible (for example, via manipulation of the injection rates of oxygen-containing gas and/or coal) to control the molten bath temperature and "steer" the process safely through this difficult start-up phase, particularly that part of the phase in which there is insufficient slag in the vessel, without exceeding critical heat flux levels and tripping the start-up sequence of the smelting process.

In general terms, the present invention provides a method of starting (which term includes "re-starting") a molten bath-based process for smelting a metalliferous material including using heat flux of water-cooled elements in lower parts of a smelting vessel to provide an indication of molten bath temperature during at least an early part of the start-up method and adjusting injection rates of oxygen-containing gas and/or carbonaceous material into the smelting vessel to control the molten bath temperature during start-up to avoid exceeding critical heat flux levels and tripping the start-up method.

In more specific terms, the present invention provides a method of starting (which term includes "re-starting") a molten bath-based smelting process for a metalliferous material in a smelting vessel that defines a smelting chamber and producing molten metal, with the method including supplying a charge of hot metal into the smelting chamber, supplying feed materials into the smelting chamber and generating heat and forming molten slag and thereafter increasing the amount of molten slag in the smelting chamber, with the hot metal and the molten slag forming a molten bath in the smelting chamber, monitoring the heat flux of a side wall of the vessel in contact with the molten bath to obtain an indication of the temperature in the molten bath as the amount of slag increases, and adjusting the supply rates of solid carbonaceous material and/or oxygen-containing gas and optionally metalliferous material into the smelting chamber to adjust the heat input into the smelting chamber and thereby control the temperature of the molten bath so that the bath temperature does not cause high heat fluxes on the side wall of the vessel that trip the start-up sequence of the smelting process.

In more specific terms, the present invention provides a method of starting a molten bath-based process for smelting a metalliferous material in a smelting vessel and producing molten metal, the smelting vessel including (a) an initially empty smelting chamber having a hearth and a side wall extending upwardly from the hearth, with the side wall including water-cooled elements, such as water-cooled panels, at least in a lower section of the side wall (optionally including inwardly-protruding slag-zone coolers at the lowest level of water-cooled elements), (b) a forehearth, and (c) a forehearth connection that interconnects the smelting chamber and the forehearth, and with the method including the steps of:

(a) supplying a charge of hot metal into the smelting chamber via the forehearth;

(b) supplying a solid carbonaceous material and an oxygen-containing gas into the smelting chamber after completing the hot metal charge and igniting the carbonaceous material and heating the smelting chamber and hot metal and forming molten slag and thereafter increasing the amount of molten slag, with the hot metal and molten slag forming a molten bath in the smelting chamber; and (c) supplying a metalliferous material into the molten bath and smelting metalliferous material to molten metal;

and wherein, during steps (b) and (c), the method including controlling the temperature of the molten bath by:

(i) monitoring the heat flux of water-cooled elements in contact with the molten bath to obtain an indication of the temperature in the molten bath, and (ii) adjusting the supply rates of the solid carbonaceous material and/or the oxygen-containing gas and optionally metalliferous material having regard to water-cooled element heat flux to adjust the heat input into the smelting chamber and thereby control the temperature of the molten bath so that the bath temperature does not cause high heat fluxes in the water-cooled elements that trip the start-up sequence of the smelting process.

The method may include adjusting the supply rates of solid carbonaceous material and oxygen-containing gas and optionally metalliferous material into the smelting chamber to adjust the heat input into the smelting chamber and thereby control the temperature of the molten bath to be within a range such that (i) high heat fluxes capable of tripping the plant are avoided as the inventory of slag builds up and (ii) low bath temperatures leading to slag fluidity/foaming/heat transfer issues are avoided. If both of these conditions are satisfied, metal production (in significant quantity) will be achieved early and hot metal from the main chamber will flow in to the forehearth connection. Typically, when there is "new" hot metal present in the forehearth connection the process is considered to have been started successfully.

In the context of the above discussion of smelting vessels having water-cooled elements, a heat flux range of 200-500 kW/m$^2$ of the exposed element surface area is indicative of the temperature range mentioned in the preceding paragraph. It is noted that the precise numerical limits of the heat flux range may vary subject to a range of factors including but not limited to different smelter constructions and different metalliferous and other feed materials.

The method may include preheating the smelting chamber, the forehearth, and the forehearth connection.

The method may include preheating a hearth of the vessel, the forehearth, and the forehearth connection such that an average surface temperature of the hearth, the forehearth, and the forehearth connection is above 1000° C.

The method may include preheating the hearth of the vessel, the forehearth, and the forehearth connection such that an average surface temperature of the hearth, the forehearth, and the forehearth connection is above 1200° C.

The method may include supplying sufficient hot metal in step (a) so that the level of the hot metal is at least about 100 mm above the top of the forehearth connection.

The method may include injecting a gas or liquid fuel (such as natural gas, LPG or oil) and an oxygen-containing gas into the gas space above the metal for a period of time after supplying the hot metal charge into the smelting chamber to generate heat in the smelting chamber.

The method may include supplying flux material into the smelting chamber in steps (b) and (c) to promote molten slag formation.

The method may include injecting slag or slag-forming agents such as silica sand/bauxite plus lime/dolomite flux to promote molten slag formation.

The method may include commencing step (c) of supplying the metalliferous material into the molten bath at any time during the course of step (b).

The molten bath-based smelting process may include the steps of:

(a) supplying carbonaceous material and solid or molten metalliferous material into the molten bath and generating reaction gas and smelting metalliferous material and producing molten metal in the bath, (b) supplying oxygen-containing gas into the smelting chamber for above-bath combustion of combustible gas released from the bath and generating heat for in-bath smelting reactions; and (c) producing significant upward movement of molten material from the bath by gas upwelling in order to create heat-carrying droplets and splashes of molten material which are heated when projected into the combustion region in the top space of the smelting chamber and thereafter fall back into the bath, whereby the droplets and splashes carry heat downwards into the bath where it is used for smelting of the metalliferous material.

The present invention provides a molten bath-based process for smelting a metalliferous material in a smelting vessel that includes the above-described method of starting (which term includes "re-starting") the process.

The present invention provides an HIsmelt process for smelting a metalliferous material in a smelting vessel that includes the above-described method of starting (which term includes "re-starting") the process.

The present invention provides an HIsarna process for smelting a metalliferous material in a smelting vessel that includes the above-described method of starting (which term includes "re-starting") the process.

The metalliferous material may be any suitable material. By way of example, the metalliferous material may be an iron-containing material.

The carbonaceous material may be any suitable material. For example, the carbonaceous material may be coal.

The oxygen-containing gas may include air, oxygen, or oxygen-enriched air.

BRIEF DESCRIPTION OF THE DRAWINGS

An embodiment of the method of starting a molten bath-based smelting process in a smelting vessel in accordance with the present invention is described with reference to the accompanying drawings, of which.

DESCRIPTION OF EMBODIMENT(S)

Figure 1:
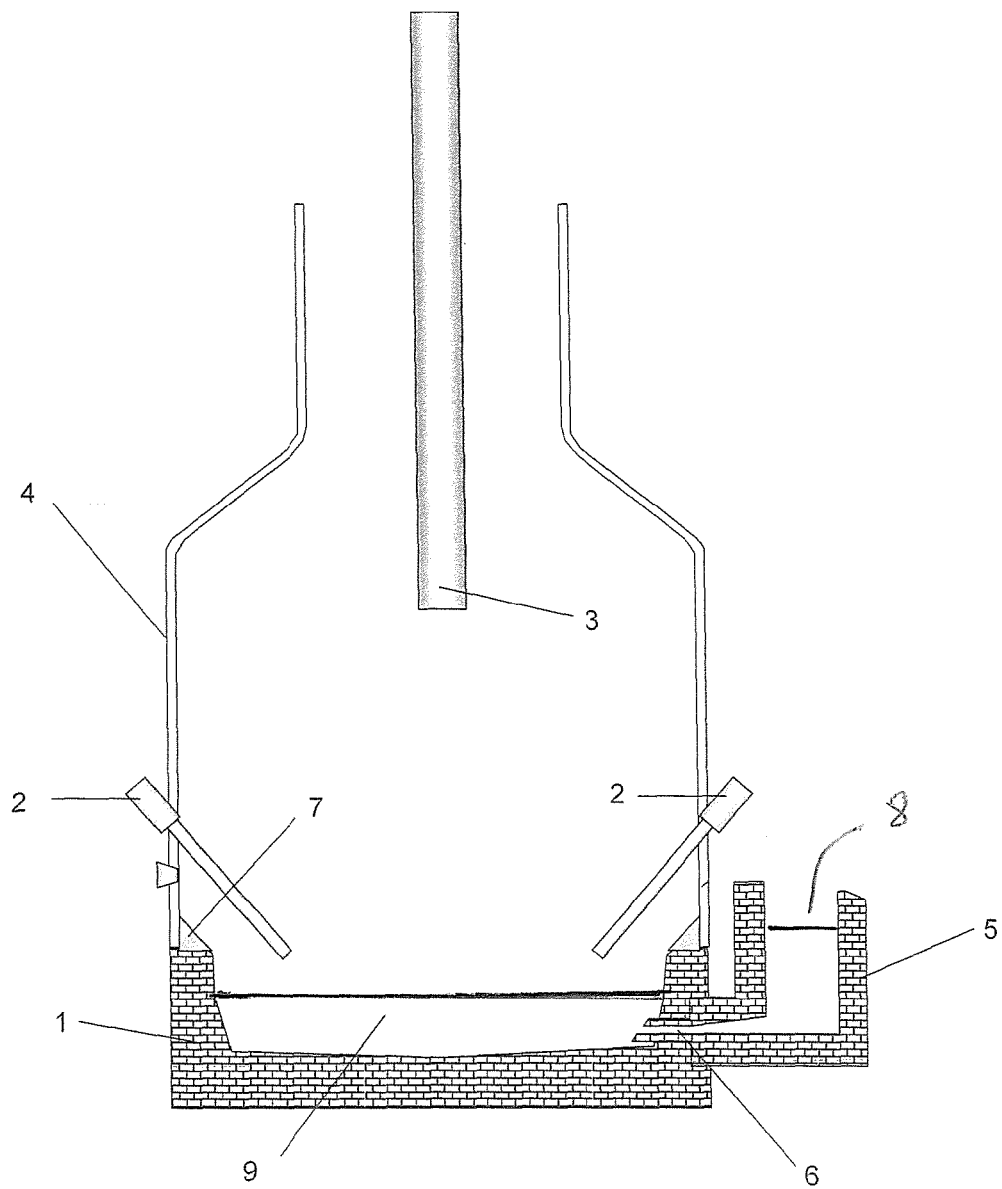
FIG. 1 is a cross-sectional view of the smelting vessel of a smelting apparatus for producing molten metal in accordance with the HIsmelt process which illustrates the molten metal level in the vessel after supplying molten metal to the vessel during the course of one embodiment of a method of starting up a smelting process in the vessel in accordance with the invention.
Figure 2:
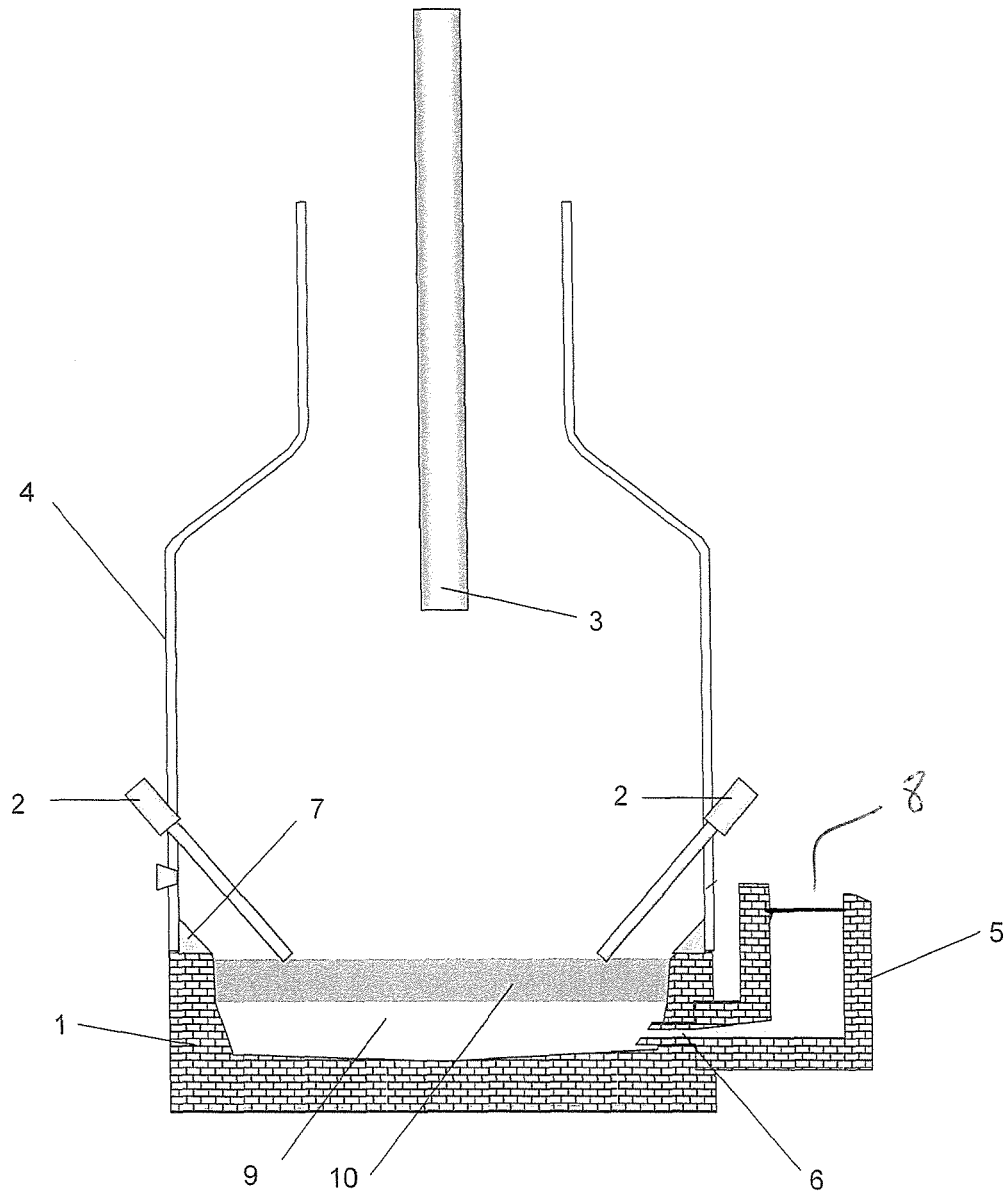
FIG. 2 is a cross-sectional view of the smelting vessel shown in FIG. 1 which illustrates the molten metal and slag levels in the smelting vessel at the end of a successful method of starting up the smelting process in the vessel in accordance with the invention.

FIGS. 1 and 2 show in very diagrammatic and simplified form a smelting vessel for smelting metalliferous material to molten metal in accordance with the HIsmelt process.

As is indicated above, the HIsmelt process is an example of a molten bath-based smelting process for producing molten metal from a metalliferous feed material in a smelting vessel that has a strong bath/slag fountain generated by gas evolution in the molten bath, with the gas evolution being at least partly the result of devolatilisation of carbonaceous material into the molten bath. As is also indicated above, the HIsmelt process is described in a considerable number of patents and patent applications in the name of the applicant. By way of example, the HIsmelt process is described in International application PCT/AU96/00197 (WO1996/032627) in the name of the applicant. The disclosure in the patent specification lodged with the International application is incorporated herein by cross-reference. The metalliferous material may be any suitable material. Iron-containing material such as iron ore is one type of metalliferous material of particular interest to the applicant.

FIGS. 1 and 2 show the vessel at different steps in a method of starting up the HIsmelt process in the vessel.

With reference to FIGS. 1 and 2, the vessel defines a smelting chamber and has a refractory-lined hearth 1, water-cooled solids injection lances 2, a water-cooled top lance 3 for oxygen-containing gas, and a water-cooled side wall 4. Water-cooled side wall 4 typically comprises an outer steel shell (not shown) and a plurality of water-cooled elements (not shown) in the form of panels having metal water-cooled tube sections on the inside and frozen slag on the side of the panels facing into the vessel and either frozen slag or castable refractory material (or a combination) between the water-cooled tubes and the outer shell. The above-mentioned International application provides further details of typical water-cooled panels. The vessel also comprises a forehearth 5 that defines a forehearth chamber 8 and a forehearth connection 6 that includes a passageway that interconnects the smelting chamber and the forehearth chamber.

Slag-zone coolers 7 are positioned at the top of the hearth refractory material. The slag zone coolers may be of any suitable construction. One example of a suitable slag zone cooler is described in International application PCT/AU2007/000688 (WO2007/134382) in the name of the applicant. The disclosure in the patent specification lodged with the International application is incorporated herein by cross-reference.

The slag-zone coolers 7 and the water-cooled panels of the side wall 4 that are immediately above the slag zone coolers 7 are considered to be water-cooled panels in the "lower parts" of the vessel.

In this embodiment, the maximum allowable heat flux for the water-cooled panels is 500 kW/m$^2$. As indicated above, the maximum allowable heat flux for the panels in any given situation depends on a range of factors such as different smelter constructions and different metalliferous and other feed materials and can readily be determined.

One embodiment of the method of starting up a HIsmelt smelting process in the vessel in accordance with the present invention includes a first step of preheating refractory in the vessel, including the forehearth chamber 8 and the forehearth connection 6. The preheating temperature and time are a function of a number of factors including but not limited to the type and the amount of refractory material in the vessel.

When the preheating step is completed, a charge of an externally prepared hot metal (such as molten iron) is then poured into the smelting chamber via the forehearth 5 in such a quantity that the metal level is at least about 100 mm above the top of the forehearth connection 6. This step results in a metal inventory 9 in the smelting chamber as shown in FIG. 1.

Injection of carbonaceous material in the form of coal in the case of this embodiment and fluxes via lances 2 is then initiated. At the same time, injection of an oxygen-containing gas in the form of a hot air blast via lance 3 is initiated. The injection of these feed materials results in the formation of a molten slag 10 on the hot metal charge. The hot metal and the slag form a molten bath in the vessel. The amount of molten slag increases as the injection of coal, fluxes and hot air continues. Metal splashing begins with the injection of coal, fluxes and hot air and, at this point, the panels in the lower parts of the vessel show high heat fluxes wherever metal splash occurs—this need not be uniform around the circumference, and the effect may be concentrated in regions that are more or less on the opposite side of the injection lances. Non-uniformity may also arise from splash patterns being asymmetric and hot combustion flames from lance 3 being directed preferentially to regions of low splash intensity.

As is indicated above, high heat fluxes in the lower parts of the vessel are a concern because of the risk of tripping the sequence of the start-up method in the vessel.

As is indicated above, the applicant has found that (1) heat flux of the panels in the lower parts of the vessel provides an indication of molten bath temperature particularly when there is a small amount of molten slag in the vessel and, (2) using this information it is possible via manipulation of the injection rates of coal and/or hot air to control the molten bath temperature and avoid exceeding a critical flux level and tripping the start-up method, leading to a shut-down. In this embodiment, the critical heat flux level is 500 $kW/m^2$. The heat flux in the water-cooled panels in the lower parts of the vessel may be determined by monitoring the inlet and outlet water temperatures and flow rates for the water-cooled panels and making heat flux calculations based on this data. All of the water-cooled panels may be monitored. Alternatively, a selection of the water-cooled panels may be monitored. These selected water-cooled panels may be in sections of the vessel that are known to be highly susceptible to splashing that causes high heat fluxes in those sections. Alternatively, the selected water-cooled panels may be representative of the overall heat flux in the lower parts of the vessel and the data may be used as a basis for heat flux calculations for all of the water-cooled panels in the lower parts of the vessel. The heat flux monitoring may be continuous or periodic.

During this period of injection of coal, fluxes and hot air, if the heat flux calculations indicate that the heat flux has increased to or is increasing towards unacceptably high amounts, the feed material injection conditions are adjusted as required to reduce the heat generated in the lower parts of the vessel. Typically, this involves reducing the injection flow rates of coal and/or hot air.

This period of coal and flux injection with hot air is maintained for about 30-60 minutes and typically, during this period, heat fluxes generally increase.

Once heat fluxes in the lower parts of the vessel are generally above 200 $kW/m^2$, injection of metalliferous material, such as iron ore, is started. Heat flux monitoring continues during this period. Coal and hot blast rates continue to be modulated to keep the maximum heat flux below 500 $kW/m^2$, whilst slowly increasing ore injection rates.

Initially, this phase of the start-up method is sensitive and heat fluxes can "spike" if, for example, coal and/or metalliferous material feed rates experience any type of flow disturbance. Such disturbances are possible, since metalliferous material feed (in particular) is at a small percentage of its nominal design rate and solids feeding devices often experience difficulty in maintaining smooth flow under such conditions.

Over the next 1-3 hours the slag inventory increases and, as a consequence, the process slowly becomes less sensitive to high heat flux spikes. As the nature of the splash changes from predominantly metal to a mixture of metal and slag, and from there ultimately to predominantly slag, the panels in the lower parts of the vessel become insulated with frozen slag on the exposed surfaces of the panels and heat fluxes drop. At this stage, heat flux monitoring is less important. Once a (calculated) slag level of about 0.8-1.5 m (depending on vessel size) has been established in the vessel, lower panel heat fluxes are likely to have fallen below 200 $kW/m^2$ and the process is considered to have safely passed through the start-up method. This condition is illustrated in FIG. 2 which shows the vessel with slag layer 10 in place.

As described above, the method of starting a molten bath-based direct smelting process in accordance with the invention is applicable to the HIsmelt and HIsarna processes, as well as other molten bath-based direct smelting processes.

Figure 3:
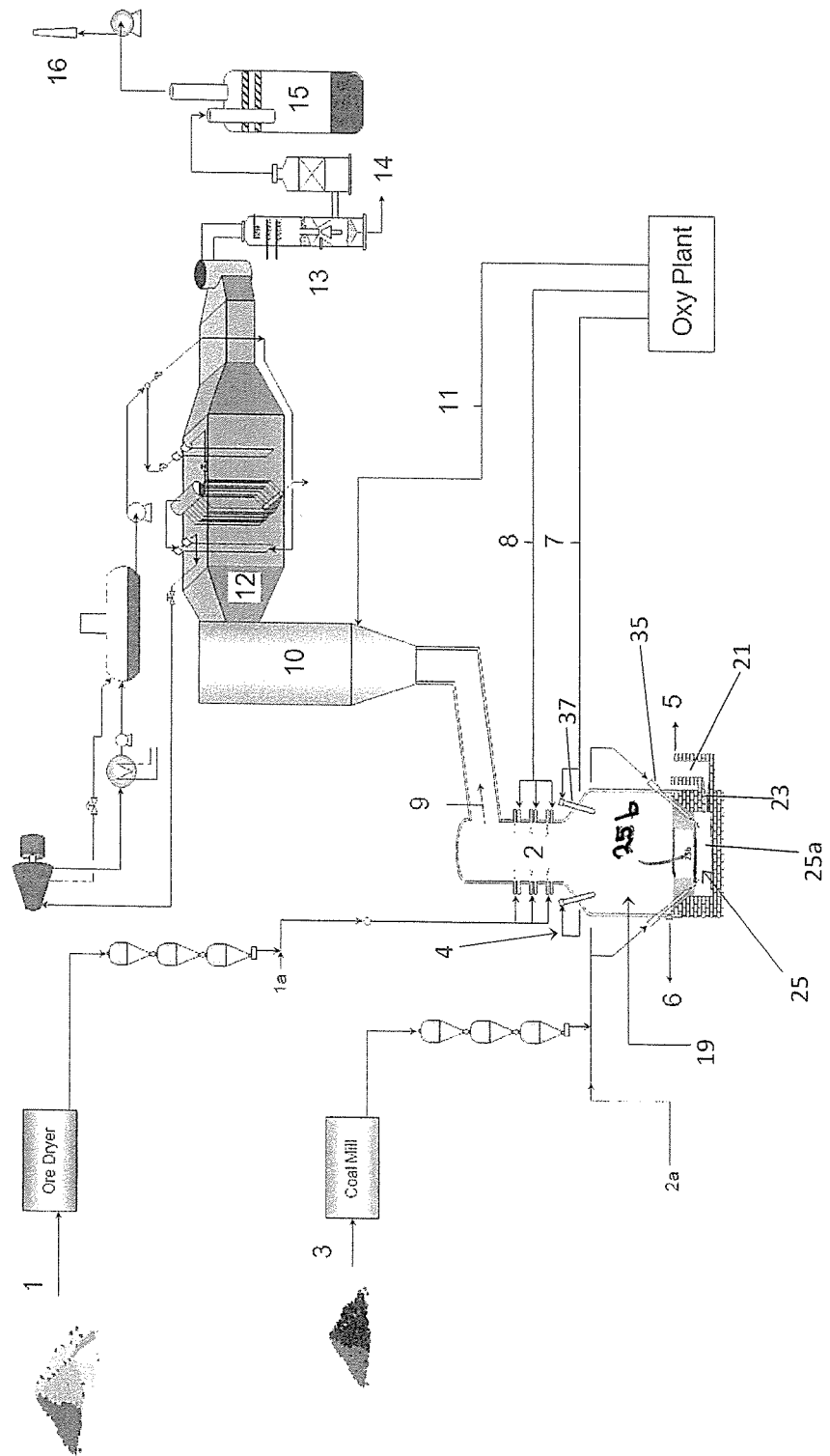
FIG. 3 is a diagrammatic view of one embodiment of an HIsarna apparatus for smelting a metalliferous material and producing molten metal in accordance with the HIsarna process.

With reference to FIG. 3, the HIsarna process smelts metalliferous feed material and produces process outputs of molten metal, molten slag, and an off-gas. The following description of the HIsarna process is in the context of smelting metalliferous material in the form of iron ore. The present invention is not limited to this type of metalliferous material.

The HIsarna apparatus shown in FIG. 3 includes a smelt cyclone 2 and a molten bath-based smelting vessel 4 of the type described with reference to FIGS. 1 and 2 having a smelting chamber 19 located directly beneath the smelt cyclone 2, with direct communication between the chambers of the smelt cyclone 2 and the smelting vessel 4.

With reference to FIG. 3, during steady-state operation of a smelting campaign, a blend of magnetite-based ore (or other iron ore) with a top size of 6 mm and flux such as limestone 1 is fed, via an ore dryer, and with a pneumatic conveying gas 1*a*, into the smelt cyclone 2. Limestone represents roughly 8-10 wt % of the combined stream of ore and limestone. Oxygen 8 is injected into the smelt cyclone 2 via tuyeres to preheat and partly melt and partly reduce the ore. The oxygen 8 also combusts combustible gas that has flowed upwardly into the smelt cyclone 2 from the smelting vessel 4. The partly melted and partly reduced ore flows downwardly from the smelt cyclone 2 into a molten bath 25 of metal and slag in the smelting chamber 19 in the smelting vessel 4. The partly melted and partly reduced ore is smelted to form molten iron in the molten bath 25. Coal 3 is fed, via a separate dryer, to the smelting chamber 19 of the smelting vessel 4. The coal 3 and a conveying gas 2*a* are injected via lances 35 into the molten bath 25 of metal and slag in the smelting chamber 19. The coal provides a source of a reductant and a source of energy. FIG. 3 shows the molten bath 25 as comprising two layers, of which layer 25*a* is a molten metal layer and layer 25*b* is a molten slag layer. The Figure illustrates the layers as being of uniform depth. This is for illustration purposes only and is not an accurate representation of what would be a highly agitated and well-mixed bath in operation of the HIsarna process. The mixing of the molten bath 25 is due to devolatilisation of coal in the bath, which generates gas, such as CO and $H_2$, and results in upward movement of gas and entrained material from the molten bath into a top space of the smelting chamber 19 that is above the molten bath 25. Oxygen 7 is injected into the smelting chamber 19 via lances 37 to post-combust some of these gases, typically CO and $H_2$, generated in and released from the molten bath 25 in the top space of the smelting chamber 19 and provide the necessary heat for the smelting process in the bath.

After start-up, normal operation of the HIsarna process during a smelting campaign involves (a) coal injection via lances 35 and cold oxygen injection via lances 37 into the smelting chamber 19 of the smelting vessel 4 and (b) ore injection 7 and additional oxygen injection 8 into the smelt cyclone 2.

The operating conditions, including but not limited to, coal and oxygen feed rates into the smelting chamber 19 of the smelting vessel 4 and ore and oxygen feed rates into the smelt cyclone 2 and heat losses from the smelting chamber 19, are selected so that offgas leaving the smelt cyclone 2 via an offgas outlet duct 9 has a post-combustion degree of at least 90%.

Offgas from the smelt cyclone 2 passes via an offgas duct 9 to an offgas incinerator 10, where additional oxygen 11 is injected to burn residual $CO/H_2$ and provide a degree of free oxygen (typically 1-2%) in the fully combusted flue gas.

Fully combusted offgas then passes through a waste heat recovery section 12 where the gas is cooled and steam is generated. Flue gas then passes through a wet scrubber 13 where cooling and dust removal are achieved. The resulting sludge 14 is available for recycle to the smelter via the ore feed stream 1.

Cool flue gas leaving the scrubber 13 is fed to a flue gas desulphurisation unit 15.

Clean flue gas is then vented via a stack 16. This gas consists mainly of $CO_2$ and, if appropriate, it can be compressed and geo-sequestered (with appropriate removal of residual non-condensable gas species).

The smelting vessel 4 includes a refractory-lined hearth 33 and side walls 41 defined predominantly by water-cooled elements in the form of water-cooled panels that define the smelting chamber 19. The smelting vessel 4 also includes a forehearth 21 which is connected to the smelting chamber 19 via a forehearth connection 23. As indicated above, the smelting vessel 4 is of the type described with reference to FIGS. 1 and 2. Moreover, the embodiment of the method of starting up a HIsmelt smelting process in a vessel in accordance with the present invention as described with reference to FIGS. 1 and 2 may be used to start-up the smelting process in the vessel 4.

During the course of a smelting campaign of the HIsarna process, molten metal produced in the smelting chamber 19 discharges from the smelting chamber 19 via the forehearth connection 23 and the forehearth 21. Under steady-state normal operating conditions, the forehearth 21 and the forehearth connection 23 contain molten metal. The normal manometer overflow system functions via "excess" metal (from production) spilling over forehearth lip 5 to keep the molten metal level in the smelting chamber 19 substantially constant.

Many modifications may be made to the embodiment of the process of the present invention described above without departing from the spirit and scope of the invention.

By way of example, whilst the smelting vessels shown in the Figures include a forehearth, it is noted that the process start-up method of the invention is not confined to vessels that include forehearths.

In addition, whilst the smelting vessels shown in the Figures include water-cooled elements, including water-cooled panels of the side wall 4 and slag-zone coolers 7 at the top of the hearth, it is noted that the process start-up method of the invention is not confined to vessels that include these elements. The side walls of the smelting vessels may be any suitable construction whereby the heat flux from the side walls of the vessels in contact with the molten baths provides an indication of the temperature of the molten baths.

In addition, whilst the embodiments focus on smelting metalliferous material in the form of iron-containing material, it is noted that the invention extends to smelting other materials.

The invention claimed is:

1. A method of starting a molten bath-based process for smelting a metalliferous material in a smelting vessel and producing molten metal, the smelting vessel including (a) an initially empty smelting chamber having a hearth and a side wall extending upwardly from the hearth, with the side wall including water-cooled elements at least in a lower section of the side wall, (b) a forehearth, and (c) a forehearth connection that interconnects the smelting chamber and the forehearth, with the method including the steps of:

(a) supplying a charge of molten metal into the smelting chamber via the forehearth;

(b) supplying a solid carbonaceous material and an oxygen-containing gas into the smelting chamber after completing the molten metal charge and igniting the carbonaceous material and heating the smelting chamber and molten metal and forming molten slag and thereafter increasing the amount of molten slag, with the molten metal and the molten slag forming a molten bath in the smelting chamber;

(c) supplying a metalliferous material into the molten bath and smelting metalliferous material to molten metal; and wherein, during step (b), the method including controlling the temperature in the molten bath by:

(i) monitoring heat flux of water-cooled elements in contact with the molten bath to obtain an indication of the temperature in the molten bath, and (ii) adjusting the supply rates of the solid carbonaceous material and/or the oxygen-containing gas having regard to water-cooled element heat flux to adjust the heat input into the smelting chamber and thereby control the temperature of the molten bath.

2. The method defined in claim 1 includes preheating the smelting chamber, the forehearth, and the forehearth connection.

3. The method defined in claim 1 includes preheating a hearth of the vessel, the forehearth, and the forehearth connection such that an average surface temperature of the hearth, the forehearth, and the forehearth connection is above 1000° C.

4. The method defined in claim 1 includes preheating a hearth of the vessel, the forehearth, and the forehearth connection such that an average surface temperature of the hearth, the forehearth, and the forehearth connection is above 1200° C.

5. The method defined in claim 1 wherein step (a) includes supplying sufficient molten metal so that the level of the molten metal is at least about 100 mm above the top of the forehearth connection.

6. The method defined in claim 1 includes injecting a gas or liquid fuel and an oxygen-containing gas into the gas space above the metal for a period of time after completing the molten metal charge into the smelting chamber to generate heat in the smelting chamber.

7. The method defined in claim 1 wherein step (b) includes supplying flux material into the smelting chamber to promote molten slag formation.

8. The method defined in claim 1 includes injecting slag or slag-forming agents to promote molten slag formation in the molten bath.

9. The method defined in claim 1 includes commencing step (c) of supplying the metalliferous material into the molten bath at any time during the course of step (b).

10. The method defined in claim 1 wherein the molten bath-based smelting process includes the steps of:
    (a) supplying carbonaceous material and solid or molten metalliferous material into the molten bath and generating reaction gas and smelting metalliferous material and producing molten metal in the bath,
    (b) supplying oxygen-containing gas into the smelting chamber for above-bath combustion of combustible gas released from the bath and generating heat for in-bath smelting reactions; and
    (c) producing significant upward movement of molten material from the bath by gas upwelling in order to create heat-carrying droplets and splashes of molten material which are heated when projected into the combustion region in the top space of the smelting chamber and thereafter fall back into the bath, whereby the droplets and splashes carry heat downwards into the bath where it is used for smelting of the metalliferous material.

11. A method of starting a molten bath-based smelting process for a metalliferous material in a smelting vessel that defines a smelting chamber and producing molten metal, with the method including supplying a charge of molten metal into the smelting chamber, supplying feed materials including solid carbonaceous material and oxygen-containing gas into the smelting chamber and generating heat and forming molten slag and thereafter increasing the amount of molten slag in the smelting chamber, with the molten metal and the molten slag forming a molten bath in the smelting chamber, monitoring heat flux of a side wall of the vessel in contact with the molten bath to obtain an indication of the temperature in the molten bath as the amount of slag increases towards a suitable slag inventory, and adjusting the supply rates of solid carbonaceous material and/or oxygen-containing gas into the smelting chamber to adjust heat input into the smelting chamber and thereby control the temperature of the molten bath.

12. The method defined in claim 11 includes injecting a gas or liquid fuel and an oxygen-containing gas into the gas space above the metal for a period of time after completing the molten metal charge into the smelting chamber to generate heat in the smelting chamber.

13. The method defined in claim 11 includes injecting slag or slag-forming agents to promote molten slag formation in the molten bath.

14. The method defined in claim 11 wherein the molten bath-based smelting process includes the steps of:
    (a) supplying carbonaceous material and solid or molten metalliferous material into the molten bath and generating reaction gas and smelting metalliferous material and producing molten metal in the bath,
    (b) supplying oxygen-containing gas into the smelting chamber for above-bath combustion of combustible gas released from the bath and generating heat for in-bath smelting reactions; and
    (c) producing significant upward movement of molten material from the bath by gas upwelling in order to create heat-carrying droplets and splashes of molten material which are heated when projected into the combustion region in the top space of the smelting chamber and thereafter fall back into the bath, whereby the droplets and splashes carry heat downwards into the bath where it is used for smelting of the metalliferous material.

* * * * *